July 25, 1967 H. B. RICE 3,332,538
CONVEYOR STRUCTURE
Filed April 14, 1966 4 Sheets-Sheet 2
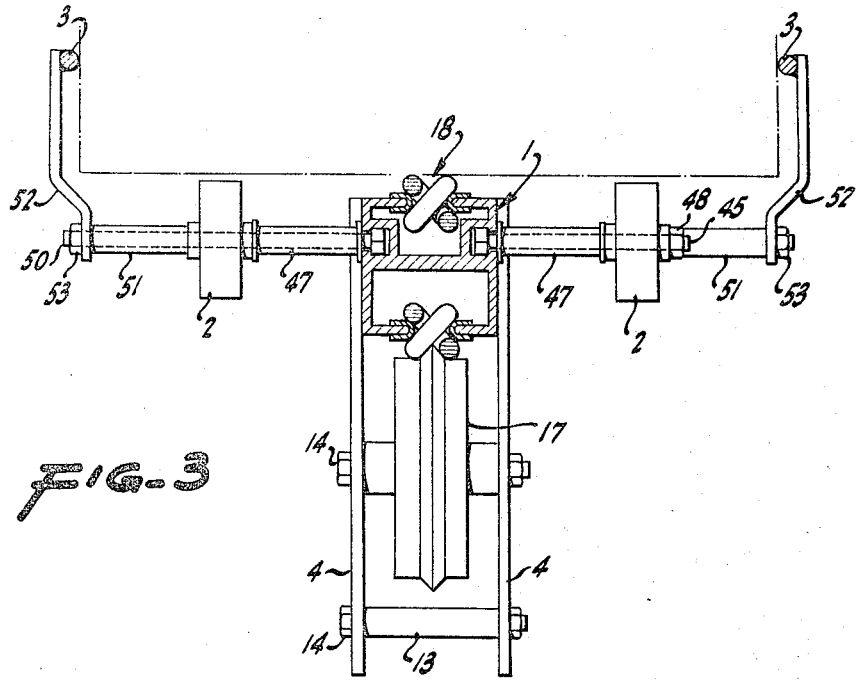
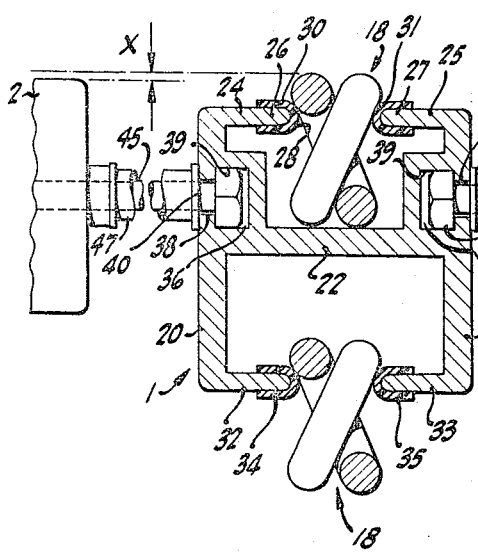
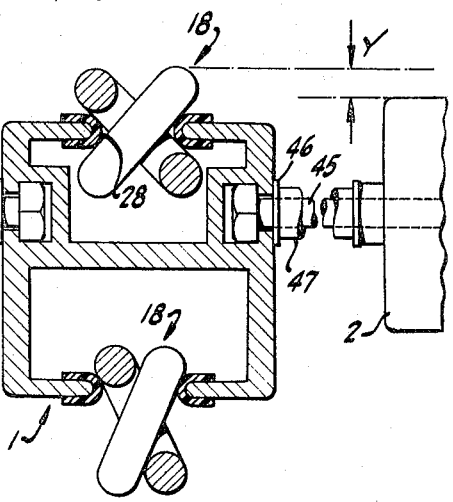
INVENTOR
HAROLD B. RICE
BY
Gordon Wood.
ATTORNEY

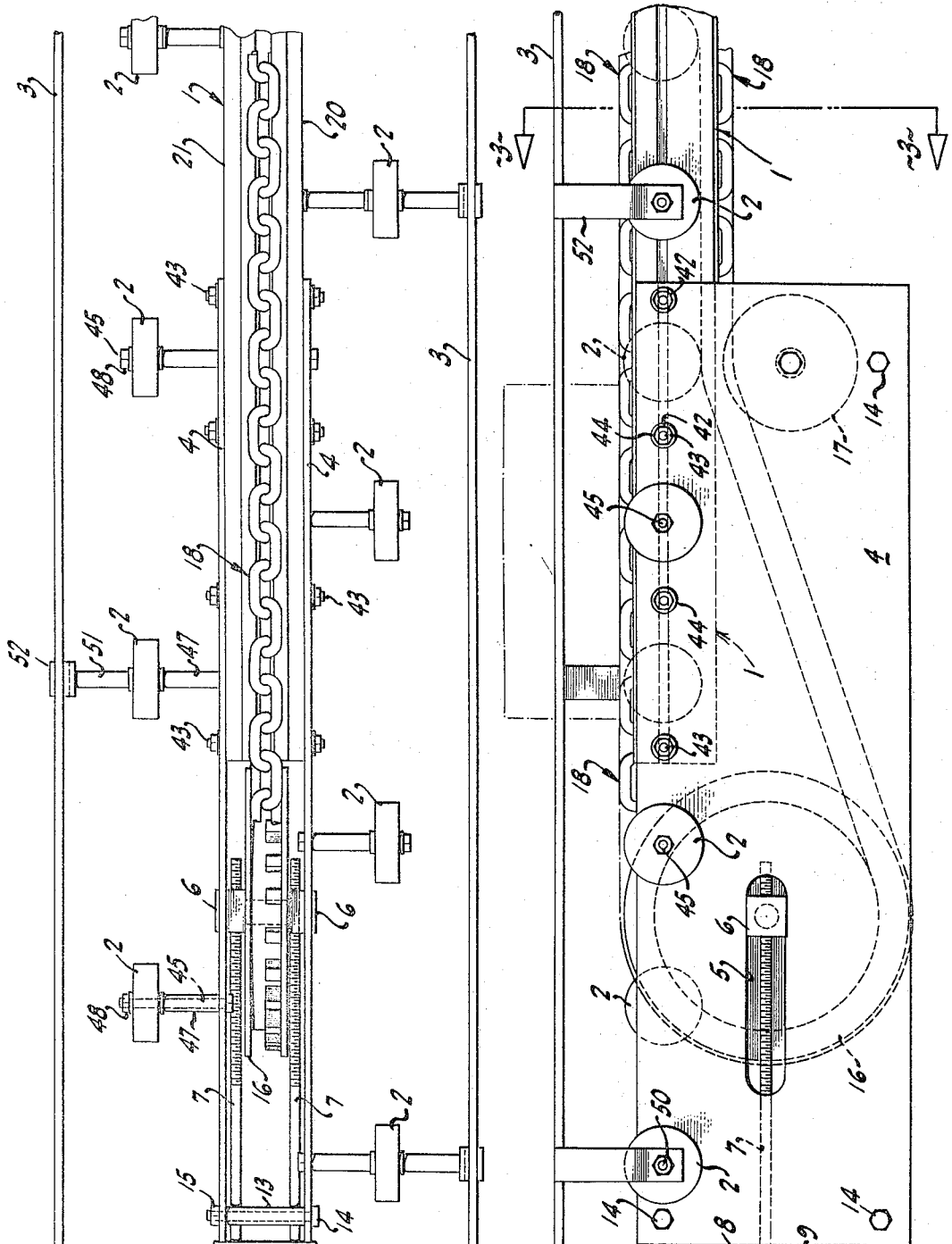

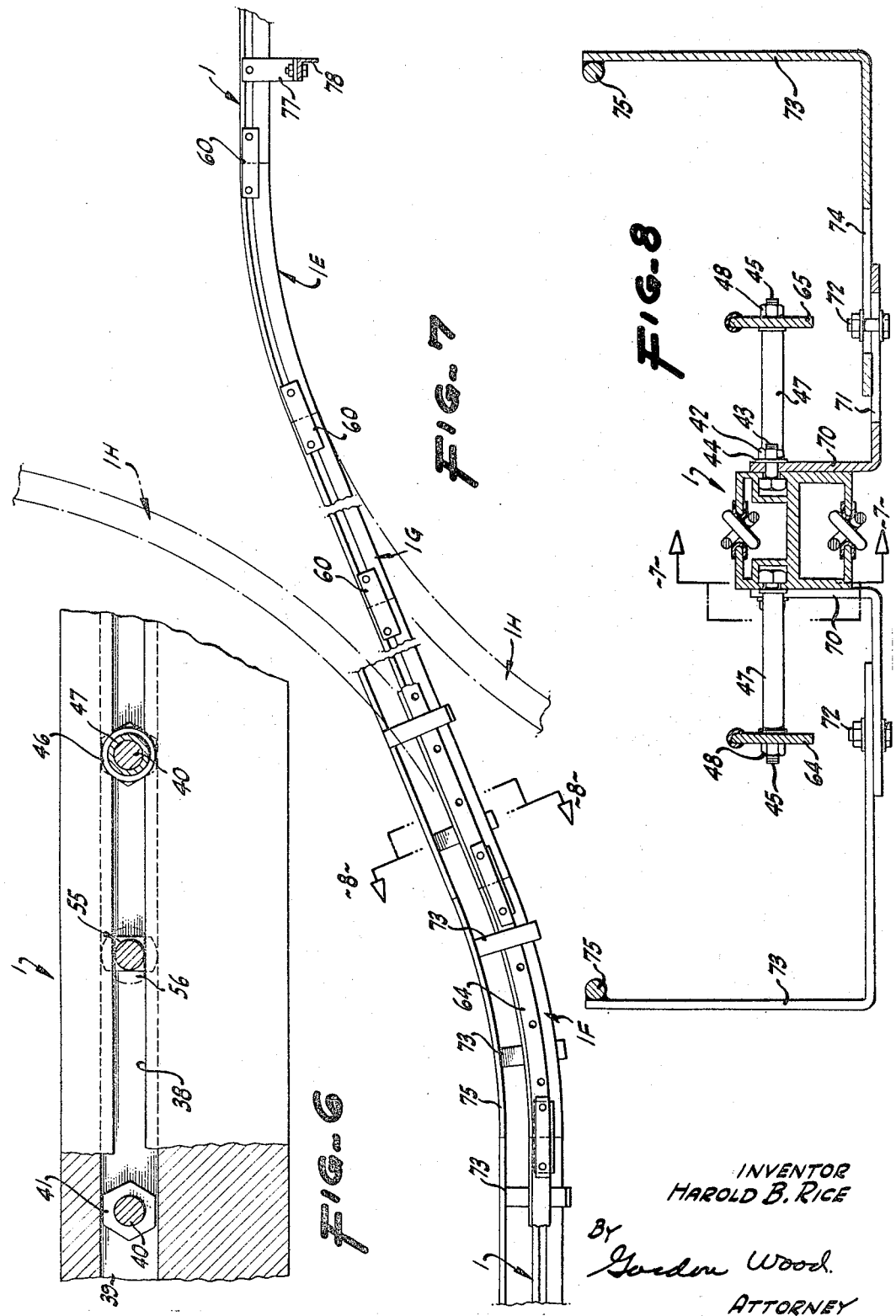

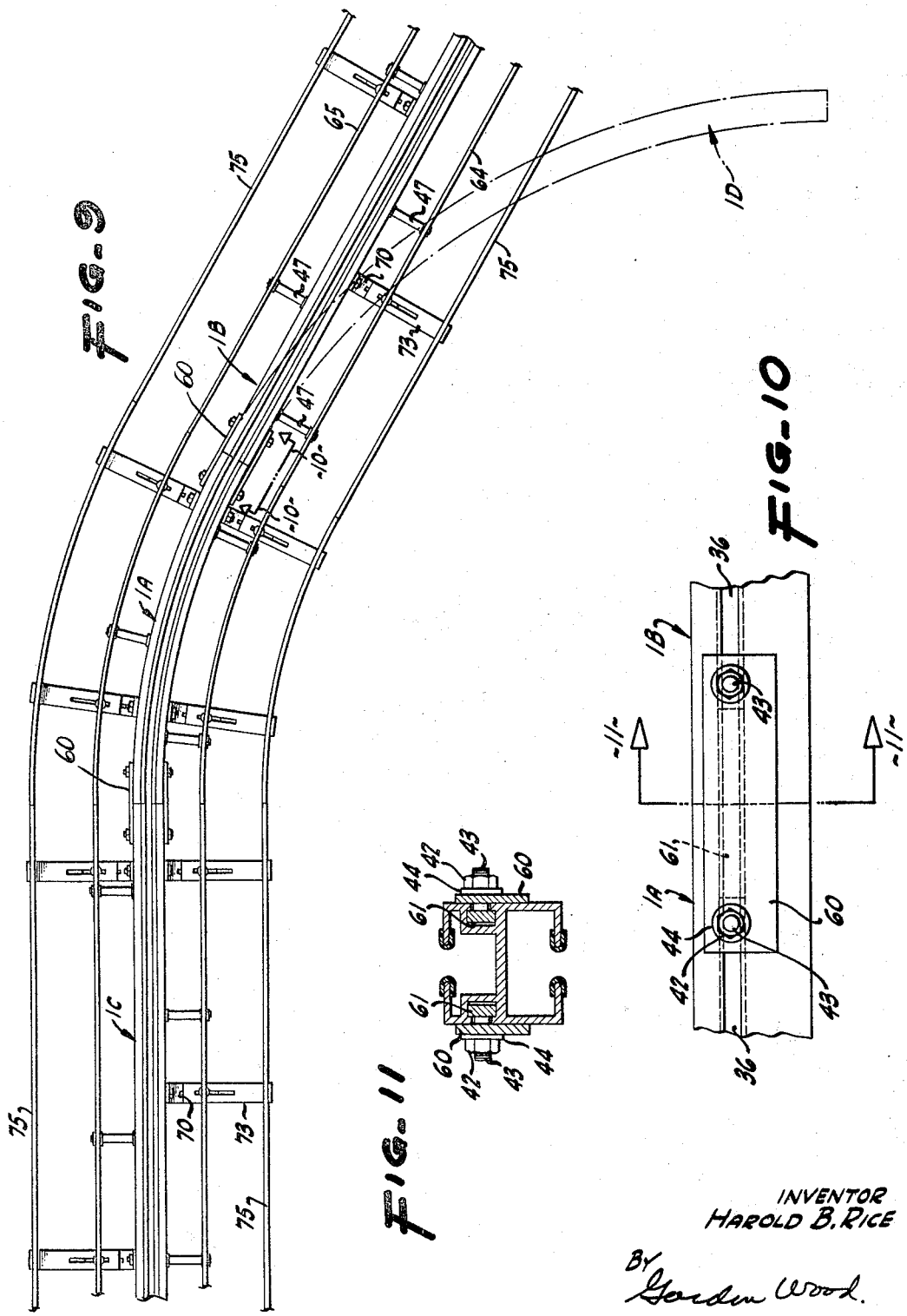

United States Patent Office 3,332,538
Patented July 25, 1967

3,332,538
CONVEYOR STRUCTURE
Harold B. Rice, Walnut Creek, Calif., assignor to John Burton Machine Corporation, Concord, Calif.
Filed Apr. 14, 1966, Ser. No. 542,580
8 Claims. (Cl. 198—204)

This application is a continuation-in-part of application Ser. No. 512,357, filed Dec. 8, 1965.

The present invention relates to "live" conveyors wherein power is supplied to the conveyor for conveying articles up inclines as well as permitting movement of articles downwardly by gravity. More particularly the invention is best adapted for use with a drag chain conveyor in which movement of the articles to be conveyed is effected by direct engagement of such articles with a moving chain as distinguished from live conveyors of the type wherein article supporting wheels are rotated by power in order to move the articles along the path of travel of the conveyor.

In the above noted pending application there is disclosed a novel form of conveyor element consisting of a plurality of interconnected chain links. One of the features of the invention disclosed in the pending application is the fact that it employs relatively inexpensive conventional chain.

Although desirable advantages accrue from use of the invention shown in the above noted application there are certain limitations inherent therein which are common to all types of conveyors presently on the market.

Probably the most undesirable characteristic of presently available conveyors is the relatively high expense involved in assembling the same. This assembly expense is in part due to the fact that a great deal of layout work must be done to erect the conveyor along the desired path of travel. A large part of such layout work is in determining the exact location of bolt holes for securement of auxiliary elements, such as runners, wheels and guides, to the frame of the conveyor. This task is particularly difficult in laying out those portions of the conveyor at which the path of travel changes. Such portions include junctures connecting sections of different elevation and various curves that are required to be formed in a horizontal plane for reversing or otherwise changing the direction of the conveyor.

In addition to the relatively large number of man hours expended in laying out the points on the conveyor at which fastening elements are to be secured there is the additional drilling and other machining steps that must be performed to permit securement of the fastening elements. Also the erection of the conveyor requires the added time consuming step of securing the auxiliary elements in place in the exact position required.

The main object of the present invention is the elimination of most of the disadvantages that attend the laying out, frabrication and assembly of conventional conveyors regardless of the particular articles to be conveyed.

Another object of the invention is the provision of a unique design incorporated in the main frame and of a shape permitting the elimination of the above noted disadvantages. This novel main frame member is designed so that the same may be economically extruded out of any desired material such as aluminum.

Still another object of the invention is the provision of a frame design for a conveyor which is inexpensive to fabricate, which lends itself to simplified layout, and which permits a speedy and accurate assembly of the conveyor and its auxiliary elements. In this connection it will be seen that the more intricate the path of travel of the conveyor the greater are the advantages of the present invention because of the exceptional flexibility resulting from the design of the main frame.

Yet another object of the invention is the provision of a conveyor frame that lends itself to extrusion and therefore incorporates greater than normal accuracy over prior art structures of like function and which may be bent in either of two planes to accommodate itself to any path of travel for which the conveyor is to be designed.

Yet another object of the invention is the provision of a conveyor which almost entirely eliminates machine steps during the process of assembly and which therefore may be set up more quickly and with greater economy than conveyors presently on the market.

Other objects and advantages of the invention will be apparent from the following specification and from the drawings.

FIG. 1 is a top plan view of the idler end of a conveyor constructed in accordance with the present invention.

FIG. 2 is a side elevation of the structure of FIG. 1.

FIG. 3 is a cross section of the conveyor structure taken in a plane indicated by lines 3—3 of FIG. 2.

FIG. 4 is a greatly enlarged cross sectional view of the main frame showing the chain in relaxed condition.

FIG. 5 is a view similar to FIG. 4 showing the upper run of the conveyor chain under tension.

FIG. 6 is a semischematic fragmentary side elevation of the frame member partly broken away to show the securement of bolts thereto.

FIG. 7 is a side view of a portion of the conveyor showing a juncture between two portions of the conveyor having different elevations.

FIG. 8 is a cross section through the conveyor as taken in a plane indicated by lines 8—8 of FIG. 7. In this view fixed runners are substituted for the article supporting rollers of FIG. 3 and different supports for the guide rods are disclosed.

FIG. 9 is a top plan view of a juncture of the conveyor at which the direction of the path of travel of the conveyor changes in a horizontal plane.

FIG. 10 is a side elevation of the conveyor at the juncture between two lengths of the conveyor frame.

FIG. 11 is a cross section taken in a plane indicated by lines 11—11 of FIG. 10.

In detail, and first with reference to FIGS. 1 and 2 wherein the idler end of a typical conveyor is shown, the invention comprises an elongated longitudinally extending main frame member generally designated 1. The particular shape of main frame member 1 will be described later on in detail but at this point it will be noted that in the embodiment of FIGS. 1 and 2 there are secured to said main frame member a plurality of wheels 2 for supporting the articles to be conveyed. These wheels 2 are preferably positioned laterally outwardly of both sides of the main frame 1 with the wheels on opposite sides being in staggered relation.

The conveyor also includes guides 3 which may be elongated rods and which are positioned laterally outwardly of the wheels 2 for laterally restraining the conveyed articles to the desired path of travel.

At the idler end shown in FIGS. 1 and 2 a pair of side plates 4 are secured to the outer sides of main frame 1 and each side plate is provided with a horizontally extending elongated slot 5 within which bearings 6 are slidably supported. Threadedly secured to bearings 6 are a pair of elongated adjusting bolts 7 which extend through suitable apertures in an end plate 8 so that the tension on the conveyor element may be adjusted by turning nuts 9 carried by said adjusting bolts and bearing on the end plate 8. Since the outer ends of side plates 4 project past the terminus of main frame 1 tubular spacers 13 may be interposed between said side plates so that the latter may be fixed in proper spaced apart relation by means of bolts 14 extending through tubular spacers 13 and by nuts 15.

Rotatably mounted on bearings 6 is an idler sprocket 16 around which is reeved the article engaging conveyor element generally designated 18. It will be understood that a powered driving sprocket is positioned at the opposite end of the conveyor and is mounted on side plates in a manner somewhat similar to that described above in connection with the idler end. A fair-lead idler 17 may also be mounted between side plates 4 (FIG. 2).

The configuration of the main frame member 1 is best seen in FIGS. 4, 5 and it will be noted that said frame has a uniform cross section throughout its entire length so that it lends itself to fabrication by extrusion. The main frame 1 comprises a pair of longitudinally extending sides 20, 21 which are integrally connected together intermediate their upper and lower edges by a cross piece or web 22. Integrally secured to the upper edges of sides 20, 21 are longitudinally extending flanges 24, 25 which extend oppositely inwardly from said sides and terminate in inner edges 26, 27. Said inner edges are spaced apart equal distances from the longitudinally extending central plane of the conveyor. The spacing between said edges 26, 27 provides a longitudinally extending slot 28 in which the conveyor element 18 is slidably disposed. In order to reduce friction on the conveyor element 18 said inner edges 26, 27 are provided with elongated strips 30, 31 of U-shaped cross section and preferably of an antifriction material such as nylon.

The bottom portion of the main frame 1 is similar to the upper portion and includes longitudinally extending flanges 32, 33 to the inner edges of which are secured antifriction strips 34, 35. At this point it will be noted that the upper article engaging run of the conveyor element 18 is supported on the upper flanges 24, 25 while the lower or return run of the conveyor element is supported on the flanges 32, 33.

Formed in sides 20, 21 of the frame 1 are outwardly opening T-shaped slots 36, 37 respectively. As best seen in FIGS. 4 and 5, these slots include an outer narrow longitudinally extending outwardly opening portion 38 and an inner enlarged portion 39. The narrow portion 38 is adapted to receive therein the shank 40 of a securing bolt with the head 41 of the bolt being received in the enlarged portion 39. It will be understood that the vertical extent of the enlarged portion 39 is preferably just slightly greater than the distance between flats of the bolt head 41 so that it is possible to slide such a bolt along the length of the T-shaped slot and so that rotation of the bolt head is prevented while the latter is being tightened.

The various auxiliary elements that may be secured to the main frame by means of the T-shaped mounting slots 36, 37 will now be described.

In mounting side plates 4 at the idler end of the conveyor (and similar plates at the driven end) it is simply necessary to slide the securing bolts 43 into the T-shaped slots from the end of the frame and, inserting the shanks of the bolts through previously punched holes in the plates 4, to tighten said bolts on washers 44 by nuts 42 to securely hold the side plates 4 in place.

When securing the article supporting wheels 2 it is merely necessary to slide the bolt heads of bolts 45 into the frame slots 36, 37, apply washers 46, insert tubular spacer 47, apply wheels 2 and tighten the assembly by means of nuts 48. If, for any reason, it is desired to change the position of any one of the wheels 2 it is a simple matter to loosen the nut 48, move the assembly to the desired position and retighten nut 48.

As best seen in FIG. 3, the side guides 3 may be secured to main frame 1 at relatively widely spaced points along the length of the latter by employing selected long bolts 50 which may be passed through the bearing of the adjacent wheel 2 and an additional tubular spacer 51 with the wheel 2 interposed and clamped between the inner spacer 47 and the outer spacer 51. The bolt 50 is passed through a suitable aperture in the lower end of an upwardly extending standard 52 which is secured at its upper end as by welding to guide rod 3.

In FIG. 6 the manner of effecting securement of the bolts to the main frame 1 is disclosed semischematically. From FIG. 6 it will be seen that the shank 40 of the bolt is slightly less in diameter than the minimum width of the T-slot and the diameter of washer 46 is considerably larger, as is the diameter of tubular spacer 47. It is, of course, preferable to insert all of the bolts that will be required for assembly of the auxiliary elements prior to the securement together of the sections of the frame 1. However, in the event it is necessary to apply additional bolts after the assembly of the conveyor, this is readily accomplished by means of a special bolt generally designated 55 which is provided with an elongated rectangular head 56 having a width small enough to pass through the narrow portion 38 of the T-slot and having a length slightly less than the vertical extent of the enlarged portion 39. By this structure it will be seen from FIG. 6 that the bolt head 56 of bolt 55 may be inserted into the T-slot in a horizontal position and then turned 90 degrees to the vertical position shown in FIG. 6 so as to permit clamping thereto any auxiliary element required in the same manner as if the bolt had been applied initially at assembly.

It is desirable to provide the frame member 1 in standard lengths of say 10 feet and to secure such lengths together as required for the particular installation desired. The method of securement of the adjacent lengths of frame 1 is best seen in FIGS. 10 and 11 wherein sections 1A and 1B of the main frame are secured together by means of a strap 60 which may be apertured adjacent its ends to receive bolts 43 with the securement of said strap 60 to the sections 1A and 1B being the same as the securement of side plates 4 in FIGS. 1 and 2. However, an important feature of the invention is that the outwardly opening slots 36 provide a simple means for effecting an extremely strong joint. This is accomplished by an elongated key 61 one half of which may be inserted in section 1A and the other half in 1B. Said key 61 being made of rectangular bar stock tightly fitting within the enlarged portion 39 of the T-slot 36 effects an extremely strong joint and at the same time serves to insure that the abutting sections of the frame are in exact alignment.

FIGS. 7, 8 and 9 show some typical configurations of a conveyor. As a modified form of the invention elongated runners for supporting the articles to be conveyed are substituted in these instances for the previously described wheels 2. It will be understood in this connection that whether wheels or runners are employed depends on the particular installation and the particular movement of the articles to be effected. As best seen in FIG. 8, elongated runners 64, 65 may be secured to the frame 1 by bolts 45 and nuts 48 in the same manner as wheels 2.

Also referring to FIG. 8 it is seen that added flexibility in supporting the article restraining guides may be achieved by the present invention. In this case an inner L-shaped bracket 70 is secured by its vertically extending leg to the frame 1 in a manner similar to strap 60. The horizontal portion of bracket 70 is preferably provided with an elongated slot 71 through which a bolt 72 is passed. The horizontal leg of bracket 70 cooperates with the horizontal leg of an outer bracket 73 which is also provided with an elongated slot 74 cooperating with slot 71 in bracket 70 to permit adjustment laterally inwardly and outwardly of the bracket 73. At the upper end of the outer bracket 73 there is welded thereto a guide strip 75 which is similar to the guide strip 3 hereinbefore described. By this structure it is seen that the assembly of runners 64, 65 and guides 75 may readily be accomplished without the use of machining or any other time consuming operations at the time of assembly.

From the above explanation it will be seen that the curved juncture in FIG. 9 is readily accomplished without requiring the installer to do more than tighten bolts in order to effect securement of the auxiliary elements to the conveyor 1. The horizontal curve which is effected by section 1A of the conveyor frame in FIG. 9 is only 30 degrees and it will be apparent that a 180 degree turn may readily be effected by simply bending the frame member 1 in a U-shape. Such a U-shape is schematically indicated at 1D in FIG. 9 and is employed to effect a change in direction of the articles. As a practical matter it is preferable to provide a plurality of 90 degree bends which may be adapted for use for almost any installation desired. For example, if a 180 degree turn is to be effected it is a simple matter to join two 90 degree bends in the manner shown in FIG. 10. Similarly, if a less severe turn is to be effected, such as shown in FIG. 9, it is a simple matter to cut a 30 degree bend from the 90 degree bend or whatever angle is desired. This is an important feature of the present invention and is attributable to the fact that the main frame 1 being formed from an extrusion may be made to very exact dimensions and with relatively close tolerances. If the main frame 1 were an assembly of fabricated parts instead of a unitary extrusion, the high degree of accuracy possible with the present invention, especially at curved junctures, could not be obtained.

Since the main frame 1 is made of an extruded material such as aluminum it lends itself to bending in both directions. Thus, in addition to the bend in a horizontal plane shown in FIG. 9, the extrusion may be bent vertically about its horizontal axis to provide a change in elevation of the conveyor as shown in FIG. 7. In this case it will be seen that two 30 degree bends 1E and 1F are joined with a straight inclined central section 1G to provide a change in elevation of the conveyor. Again, it will be understood that the frame 1 may be bent on its horizontal plane to a 90 degree bend such as indicated schematically at 1H in FIG. 7 and portions of such bend employed as required to effect the desired change in elevation.

It will be apparent that even the supports for securing the main frame 1 in place relative to a floor can readily be affixed to the frame. For example in FIG. 7 a vertically disposed standard 77 may be bolted to the T-slot portion of the side of the frame and secured to any convenient support such as indicated at 78.

The particular conveyor element 18 employed with the present invention is preferably a conventional chain of the type disclosed in pending application Ser. No. 512,357 filed Dec. 8, 1965. Although the action of said conveyor is specifically described in said pending application it may be noted here that the chain links (FIGS. 4, 5) are received in the slot 28 between upper flanges 24, 25 and between the similar flanges 32, 33 at the lower side of the frame. When the chain is relaxed, as when the conveyor is at rest, it will be seen that the links of the chain are permitted to drop downwardly to the position of the upper run shown in FIG. 4. However, when the conveyor is operating and the upper run of the chain 18 is under tension the geometry of the links is such that the chain automatically moves upwardly to the position of the upper run in FIG. 5. Thus, although the upper article engaging surfaces of the chain links in FIG. 4 are slightly spaced upwardly a distance X above the article supporting rollers 2, tension in chain 18 tends to raise said chain a relatively great distance Y above the rollers as indicated in FIG. 5. It will be apparent that the weight of the articles, such as fiberboard cases being conveyed, tends to urge the chain downwardly thereby providing a yieldability which is desirable since the chain becomes self-adjusting and applies a dragging effort to the articles in proportion to the weight of such articles. While the conveyor is operating the lower run may be in the lower positon of FIG. 5 or may be raised depending on how much tension is in such lower run.

Since the chain 18 is available as a staple article of commerce it is relatively inexpensive and easily obtained. It will be noted that such chain presents curved surfaces in all directions and especially smooth curved surfaces against the bottoms of the articles being conveyed thereby minimizing damage to the articles in the event the load is blocked and the articles remain stationary as the conveyor continues to move under them.

One important feature resulting from the provision of T-slots 36, 37 can be understood by considering FIG. 9. If the bent portion 1A of the frame were assembled with separate side plates and with bolts passed through said side plates, it will be apparent that great difficulty would be encountered in laying out the holes in the inner side plate to register with the holes in the outer side plate because said side plates would be bent to different radii. The provision of T-slots 36, 37 obviates this problem in addition to eliminating many of the usual problems encountered in fabrication and assembly as pointed out hereinbefore.

In the event it is desired to increase the capacity of a conveyor to accommodate a heavy load it is a simple matter, as explained above, to add additional wheels where required.

The above described conveyor structure is obviously usable regardless of the weight of the articles involved and it will be apparent that it is adaptable to almost any type of conveyor including lightweight applications such as document conveyors.

The very specific description given above of the preferred forms of the invention is not to be taken as restrictive as it will be apparent that various modifications in design may be resorted to by those skilled in the art without departing from the scope of the following claims.

I claim:
1. In a conveyor for moving an article along a path of travel,
   an elongated main frame in the vertical central plane of said conveyor having a uniform cross section throughout its length and adapted to be formed by extrusion,
   said frame being relatively narrow compared to the width of said path of travel,
   said frame including a pair of opposite longitudinally extending sides and a cross piece integrally connecting said sides,
   an upper pair of longitudinally extending inwardly directed flanges integrally secured at their outer edges to the upper edges of said sides and spaced apart at their inner edges to define a first elongated central slot therebetween,
   a lower pair of longitudinally extending inwardly directed flanges integrally secured at their outer edges to the lower edges of said sides to define a second elongated central slot therebetween,
   an elongated conveyor element carried by said pairs of flanges with an upper working run slidably received in said first slot and a lower return run slidably received in said second slot.
2. A conveyor according to claim 1 wherein said frame is formed with a laterally outwardly opening slot extending the entire length of each of said sides, headed fastening elements carried by said sides with the heads of said elements received in said slots, whereby said fastening elements may be adjustably positioned at various points along the length of said frame as desired.
3. A conveyor according to claim 2 wherein load supporting members are spaced laterally outwardly of said frame and secured thereto by said fastening elements.
4. A conveyor according to claim 2 wherein a plurality of brackets are secured to said frame at spaced points along the length of the latter, said brackets being secured to said frame by said fastening elements and extending laterally outwardly from both sides of said frame and provided at their outer ends with guide means for retaining said article in said path.
5. A conveyor according to claim 2 wherein each of said laterally outwardly opening slots is T-shaped in cross section and includes an outwardly opening narrow opening adapted to receive the shank of a bolt therethrough and an enlarged inner portion adapted to receive the head of a bolt therein.

6. In a conveyor for moving an article along an elongated path of travel,
  an elongated, unitary, main frame in the vertical central plane of said conveyor and including a pair of transversely spaced lateral sides,
  said frame being relatively narrow compared to the width of said path of travel,
  means integral with said frame intermediate said lateral sides for slidably supporting an elongated tension member adapted to engage such article,
  said frame being formed along each of said lateral sides with a slot,
  fastening elements received in said slots for connecting auxiliary members to said frame.

7. A conveyor according to claim 6 wherein said main frame is formed by a plurality of aligned frame sections, a connection connecting adjacent sections including an elongated strap secured to each of such adjacent sections by a bolt, with the head of each bolt received in one of said slots and with the shanks of said bolts extending through said strap.

8. A conveyor according to claim 7 wherein an elongated key is received in said slot between a pair of bolts.

References Cited

UNITED STATES PATENTS

| | | | |
|---|---|---|---|
| 1,845,066 | 2/1932 | Walter | 198—204 |
| 2,193,583 | 3/1940 | Dunlop | 198—204 |
| 3,124,239 | 3/1964 | Kornylak | 198—204 |

EVON C. BLUNK, *Primary Examiner.*

RICHARD E. AEGERTER, *Examiner.*